T. COSS.
Apparatus for Gathering Ice.
No. 151,685.  Patented June 9, 1874.
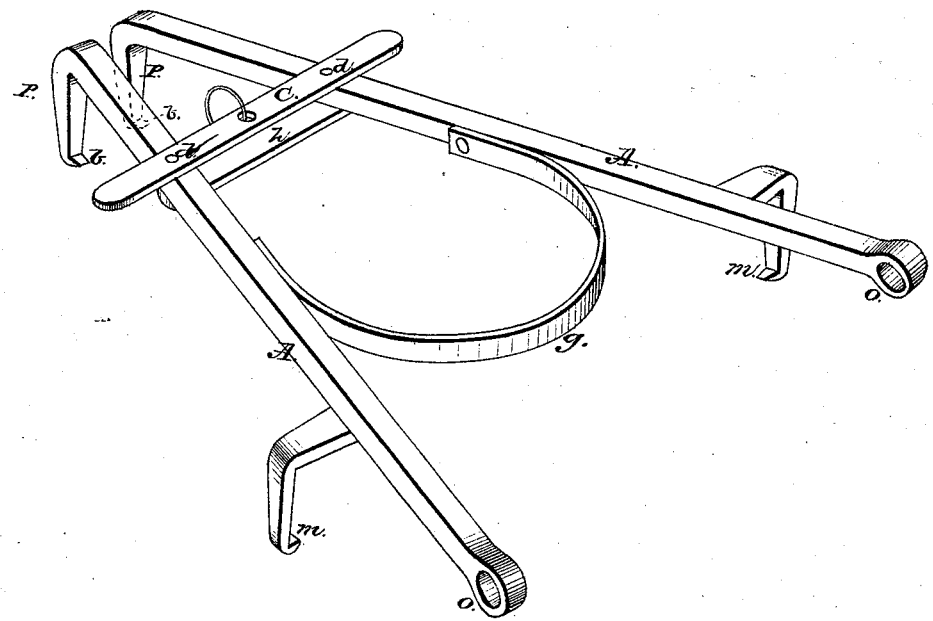

UNITED STATES PATENT OFFICE.

THOMAS COSS, OF PITTSTON, MAINE.

IMPROVEMENT IN APPARATUS FOR GATHERING ICE.

Specification forming part of Letters Patent No. 151,685, dated June 9, 1874; application filed April 10, 1874.

*To all whom it may concern:*

Be it known that I, THOMAS COSS, of Pittston, in the county of Kennebec and State of Maine, have invented a certain Improvement in Ice-Hooks, of which the following is a specification:

My invention consists in providing ice-hooks with side hooks, in combination with the end hooks, so arranged that the tendency of one end of a block of ice to tip up and cast off the hooks is effectually resisted; and also to two joints near the end hooks, which enables a spring to spread open the side hooks, so that they will drop down on each side of a block of ice.

A is the hook. Said hook is made of two bars of iron three feet long and one inch in diameter, sharpened at one end of each, and having an eye, O, turned in the other ends. About eight inches of the sharpened end of each bar is bent round to a right angle, forming a square, and about one inch of the same is turned in for a catch, $b\,b$. A bolt-hole, $d$, is made in each bar, about four inches from the end or the turn. Plate C is made eighteen inches long, with a bolt-hole six inches in from each end, and is placed on the top of the hooks A and over the bolt-holes $d\,d$. Another plate, $h$, is made eight inches long, with a bolt-hole in each end six inches apart, corresponding with the bolt-holes in plate C. The plate $h$ is placed under the hooks A, opposite the plate C, covering the holes $d\,d$ in the bars. A bolt is put through the holes in the plates C and $h$, and through the holes $d\,d$ in the bars on each side, making a pivot on which the two bars may turn, and be opened or shut together. Two side hooks, $m\,m$, are welded, one on each bar, so that when the end hooks P P are thrown over the end of a block of ice the side hooks will grapple each side. A spring, $g$, is placed between the bars to open the side hooks when the propelling power is checked. A piece of rope or chain is run through the eyes O O, and the two ends joined together, one strand of which is made fast to the propelling power.

I claim as my invention—

The side hooks $m\,m$, in combination with the bars A, the cross bars or plates C $h$, the end hooks P P, and the spring $g$, substantially as and for the purpose hereinbefore set forth.

Dated this 13th day May, in the year 1874.

THOMAS COSS.

Witnesses:
    J. W. SPAULDING,
    GEO. F. WYMOUTH.